Figure 1:
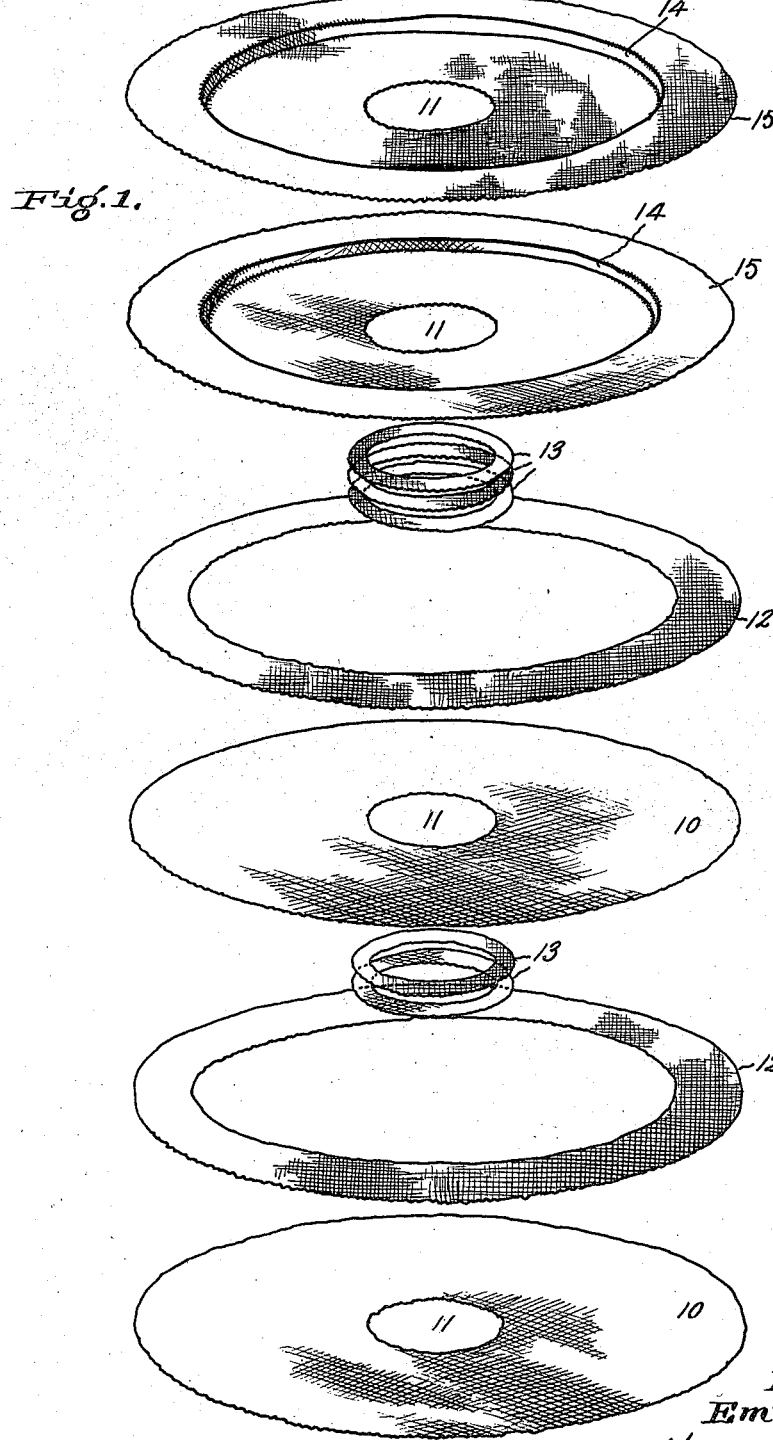

July 8, 1924. 1,501,026

E. J. GUAY

NOISELESS GEAR AND METHOD OF FORMING THE SAME

Original Filed Jan. 10, 1923  2 Sheets-Sheet 1

Inventor,
Emile J. Guay,
by
His Attorney.

July 8, 1924. 1,501,026
E. J. GUAY
NOISELESS GEAR AND METHOD OF FORMING THE SAME
Original Filed Jan. 10, 1923  2 Sheets-Sheet 2
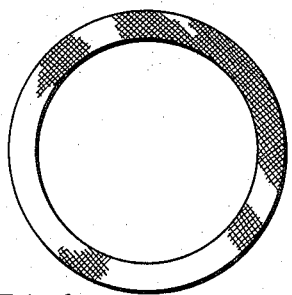
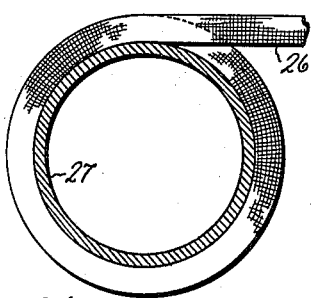
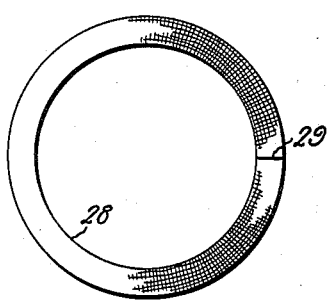
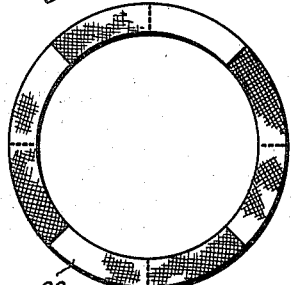
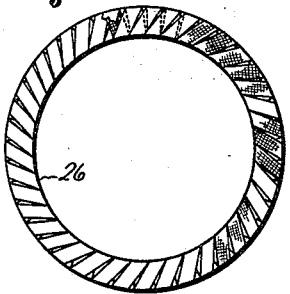
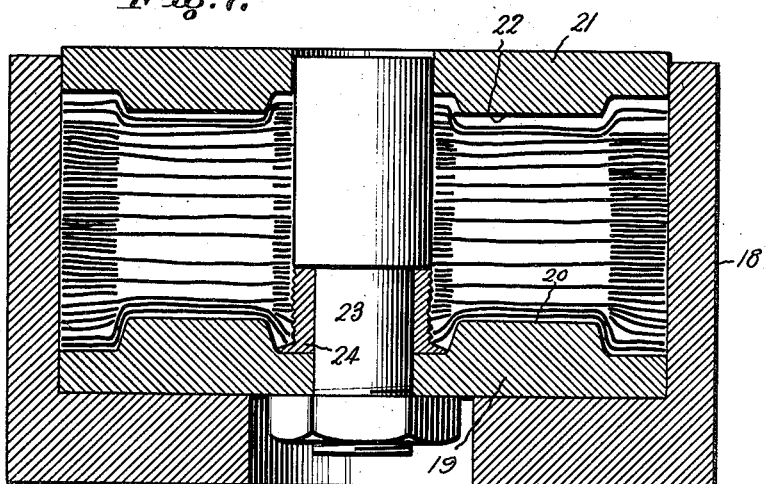
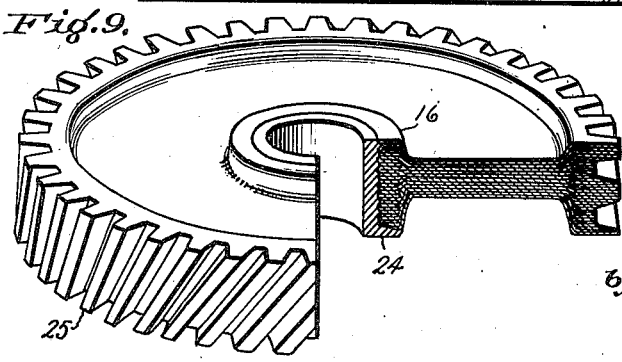
Inventor:
Emile J. Guay,
by His Attorney.

Patented July 8, 1924.

1,501,026

UNITED STATES PATENT OFFICE.

EMILE J. GUAY, OF SWAMPSCOTT, MASSACHUSETTS, ASSIGNOR TO GENERAL ELECTRIC COMPANY, A CORPORATION OF NEW YORK.

NOISELESS GEAR AND METHOD OF FORMING THE SAME.

Application filed January 10, 1923, Serial No. 611,827. Renewed January 29, 1924.

*To all whom it may concern:*

Be it known that I, EMILE J. GUAY, a citizen of the United States, residing at Swampscott, county of Essex, State of Massachusetts, have invented certain new and useful Improvements in Noiseless Gears and Methods of Forming the Same, of which the following is a specification.

The present invention relates to noiseless gears of the type composed of spinnable textile fibers and a binder for holding the fibers in a compressed state.

The object of my invention is to improve the construction of such gears and the method of making the same, and especially to reduce the cost of manufacture and the weight of the gears for a given size.

For a consideration of what I believe to be novel, and my invention, attention is directed to the accompanying description and the claims appended thereto.

In the accompanying drawings which are illustrative of my invention, Fig. 1 is an exploded view of some of the parts which are employed in making a gear blank; Fig. 2 shows one of the cut washers used in building up the rim; Fig. 3 shows a way for making such a washer from ribbon; Fig. 4 shows a washer cut from the ribbon; Fig. 5 shows a washer made up of segmental pieces; Fig. 6 shows a modified form of washer made of ribbon wound flatwise on a mandril and afterwards shaped to circular form; Fig. 7 shows a form of fixture for making the blanks; Fig. 8 a detail view showing the use of washers of different radial depth; Fig. 9 shows a finished gear with metal center with a portion cut away to show the construction, and Fig. 10 shows a gear blank without a metal center.

It is of paramount importance in gears of this type to economize in the use of the fabric (usually high grade cotton duck or canvas) on account of its expense but such action must not be made at the sacrifice of strength or other important qualities of the gear.

I attain the desired result by making the gear blank partly out of fabric disks and partly out of fabric washers. I prefer for this purpose to use tightly woven duck or canvas weighing about fourteen ounces to the yard. The washers are interspersed with the disks and co-operate therewith to form the rim or the hub or to form both the rim and hub. The washers for the rim may be of uniform radial depth or they may be of varying radial depth depending upon the shape of the gear blank. The same is also true of those forming the hub. By interspersing the washers with the disks the great advantage is obtained that the former are supported by the latter at a large number of places which greatly increases the strength of the gear as a whole. This is true not only of the center part of the rim but of its sides or edges as well, and hence the rim as a whole is uniformly strong and capable of resisting the shocks to which it is subjected in service.

In the manufacture of gears and blanks therefor the canvas or duck is first coated on one or both sides with a phenolic condensation product such as bakelite or other equivalent binder. This coating is usually done by passing the canvas before being cut through a tank containing the binder, after which it is dried. When bakelite is used it preferably has about the same specific gravity as water. To obtain the best results the final drying should be done for a short time in a vacuum tank with a moderate amount of heat so as to get rid of all or virtually all of the solvent used in the binder. By so doing I avoid saturating the fibers of the material with the binder which action tends to make them brittle. In other words the vacuum treatment removes the binder from the center of the hard, twisted threads and hence when the final pressure is applied the binder will bond the fibers together without destroying their flexibility, which is of the greatest importance because it has a direct bearing on the life of the finished gear. After being thoroughly dried the canvas is cut into disks and washers and then assembled or stacked with the disks and washers interspersed and subjected to heat to soften the binder and to pressure to compress the fibers. The heat when maintained for a sufficient length of time will cure or cause the binder to set and retain the fibers in their compressed state.

Referring to Fig. 1, 10 indicates disks made of canvas and coated with a binder, such as bakelite. In diameter they are slightly larger than the finished gear. Each disk is also provided with a central opening 11 for the shaft or for the metal hub. The disks form the web and also a part of the rim and may form the entire hub or a part thereof as desired. 12 indicates washers of the same coated material which are interspersed with the disks and cooperate with them to form the thickened rim, and 13 other and smaller washers of the same coated material which cooperate with the disks to form the hub. Since the rim is thicker than the web and since it is difficult to make the outside layers or disks conform to the finished shape in the final pressing operation, because of the liability of the fabric to wrinkle or because of injury to the fibers or both, those disks which form the two side surfaces of the blank are pre-formed. That is to say, each said disk is provided with an inset 14 and where two or more are so used on each side the insets are of such size that one can nest in the adjacent one. Such disks are indicated at 15, similar disks being provided for the opposite side of the blank. The pre-forming can best be done by first heating the coated canvas and placing it between two wooden forms of suitable shape and subjecting the same to pressure. The main thing is to so shape the outside disk or the two outside disks on each side so that they conform approximately to the side surfaces of the finished blank, without breaking or injuring the fibers. If the blank is to have a hub 16 as shown on the finished gear illustrated in Fig. 9, then that portion of the disk forming the hub will also be pre-formed.

After the desired number of disks, pre-formed and otherwise, and the washers to form the rim and hub have been made, they are stacked or assembled in a fixture or form such for example as shown in Fig. 7, and then subjected to heat and pressure, first to soften the binder and then to cause the binder to set and retain the fibers under the pressure to which they have been subjected. In this figure is indicated a casing comprising a bottom 17 and a cylindrical wall 18 rising therefrom. Inside the casing and below the canvas or other woven fabric is a stationary head 19 having a flat bottom face and an upper face 20 which conforms to that of the finished blank. Located above the canvas or other woven fabric is a second and movable head 21, the upper face of which is flat to engage a ram or platen and the under face 22 shaped to conform to that of the finished gear. The faces 20 and 22 may be similar or dissimilar as desired. Rising from the center or the lower head is a stud 23 and situated between a shoulder thereon and the head is a metal hub 24 for the finished blank. The hub has an enlarged flange at the bottom (which may be omitted if desired) and is also roughened on its periphery to ensure a good bond or union with the canvas or other material. The purpose in clamping the hub rigidly between two end members is to prevent it from moving longitudinally when pressure is applied through the head 21 to the woven fabric. The fact that it fits the stud prevents it from moving laterally and therefore the hub will be truly central of the finished blank.

From this figure can be had a good idea of the interspersed arrangement of the disks and washers. It will be seen that at each end of the stack of canvas are two preformed disks. Between these are plain disks, and between the plain disks and also between said disks and the pre-formed disks are washers which with the disks, form the rim and other washers which with the disks form the hub. In some cases a single washer may be placed between the two disks and in other cases two or more depending upon the relative thickness of the rim and hub to the web, or of the rim to the web if there be no thickened hub. If the inset in the end disk is shallow a less number of washers is usually required at this point than where the inset is deep.

After the parts have been assembled in the fixture, as shown in Fig. 7, the fixture and its contents are put into an oven and given a preliminary heating, the purpose being to soften the material and thus avoid distortions or breaking of the fibers of the canvas in the pressing operation. For this purpose a steam-heated oven may be employed and the fixture and its contents subjected to an oven temperature of from 280 to 290 degrees F. for one-half to three-quarters of an hour depending upon the size of the blank.

After the preliminary heating is completed the fixture and its contents are put into a hydraulic press, the platens of which can be heated by steam, and later cooled by water. During this operation a temperature of about 320 to 338 degrees F. is maintained for one and one-half to two hours depending upon the size of the blank. The pressure at the start is applied rather slowly to give the air and gas a chance to escape from the mass. The final pressure varies from about 1200 to 1400 lbs. per square inch of area depending upon the size of the blank. After this the steam is shut off and water admitted to the platens, to cool the fixture and its contents, for about one-half hour. During the above operations the binder is cured or set and serves to hold the fibers under the heavy compression to which they have been subjected. The blanks are then removed from the fixtures and placed in an oven having free air circulation and a temperature of from 220 to 230 degrees F., where they are allowed to remain for about 20 to 24 hours, during which time the curing process continues to some extent accompanied by a small shrinkage. After being allowed to cool they are ready for the machining operations. I have specified certain temperatures, pressures and periods of time which have been found to be satisfactory in practice but these are given as illustrations and not as limitations of my invention.

When a blank thus formed is removed from the fixture its surfaces will be found to present a smooth, glass-like appearance and are highly polished, thereby avoiding the necessity of further finishing. The teeth 25 may be cut in the blank by any suitable gear cutting machine. The broken away portion in Fig. 9 clearly shows the arrangement of the fibers after the pressing operation.

As an illustration, but not as a limitation of my invention, the gear shown in Fig. 9 is composed of four pre-formed disks, ten plain disks, twenty-four washers in the rim and twenty-one washers in the hub.

As before stated, the disks are interspersed with the washers whether the latter be at the rim or at the hub. As a result of this, both rim and hub are tied or interlocked at many places to the web and there is no portion of the rim which overhangs the web and therefore depends solely upon the binder to hold it in position. The preformed disks form the ends of the rim and are themselves securely anchored to the outer washers and to the adjacent disks.

Mention has been made of the importance of economizing the textile material. This in a plant having a reasonably large production can be attained by using the material stamped out of the center in making large washers as disks or washers for smaller gear blanks. Also the material remaining after the disks have been stamped out of a sheet can be used for small washers either for rims or hubs of small gears, or both.

In Fig. 2 is shown a rim washer which is cut from a large sheet by a dinking die, and in Fig. 3 is shown a way whereby material for such a washer may be utilized more economically. In this case the woven material is either made in ribbon form or a large sheet is cut into ribbons 26. However it is formed, it is first coated with binder on one or both sides (usually both) and afterwards wound edgewise on a mandril 27. I have found that this can be done without wrinkling if the tape be properly moistened as it is fed through the winding head to the mandril. After being coiled into a helix in this manner one complete turn 28 is cut off as shown in Fig. 4, there being of course one joint 29 in the washer.

Another way to make washers is shown in Fig. 5. In this case segmental pieces 28 are cut from sheet stock or from trimmings left after the disks are cut. When these are assembled the ends of one segment make butt joints with those of adjacent segments.

Where two or more washers of this character are required between two disks in the blank, the joints in the washers are preferably arranged brick-fashion; in other words, with overlapping joints.

Fig. 6 illustrates still another way for making washers. In this case the ribbon 26 is first wound in the form of a flat spiral on a thin, flat former and when in this condition is wound in the form of a helix of the desired diameter. In this operation it is also desirable to moisten the tape as it is being wound on the former. From the helix thus formed complete turns may be cut to make washers which have only a single joint.

In the preceding part of the specification the washers have been generally described as being of uniform radial depth in the same blank. In some cases, particularly where the web is relatively thin as compared to the axial length of the rim, it is desirable to use washers of different radial depth, especially in the region of the preformed disks, where the latter have quite a deep inset. The purpose of this is to avoid wrinkling of the fabric or injury to the fibers, and also to avoid the existence of small unfilled spaces. Such an arrangement is shown in Fig. 8 where 12 indicates the washers of uniform depth and 30 and 31 washers of greater depth, the two latter differing somewhat in this respect from each other.

In Fig. 10 is shown a gear blank constructed as above-described with the exception that the enlarged or thickened hub has been omitted. This is especially intended for the timing gear train of small automobiles. In this case the web is clamped against a flange and is held by bolts passing through it. It can, however, be secured on a shaft by a key or by a nut and key, if desired.

By making the web thinner than the rim or the hub or both a substantial saving in textile material is effected and hence the cost is decreased. It is sometimes necessary to make the rim overhang the web because of some projecting part on the machine adjacent to the gear-carrying shaft, and it has heretofore been the custom to initially make the web the same thickness as the rim and then cut it away to form an inset to provide the desired clearance. All this extra cost is avoided in my construction and a gear of better appearance is obtained.

In preparing the sheets, i. e., coating them with bakelite or other binder, care should be exercised to limit the binder to that amount which will properly hold the fibers under compression. In other words, the strength of such a gear depends upon the number of compressed fibers per unit area and not on the binder which should be used as sparingly as possible consistent with its function of holding the fibers in their compressed condition. Furthermore, it is the fibers and not the binder which impart the noiseless quality to the gear. To attain the most satisfactory results the amount of textile material by weight should be between 55 and 65 compared to 45 and 35 for the binder.

Care should be exercised in the formation of the fixture and in loading the same with disks and washers to the end that whatever pressure be applied to compress the textile material, the density of its fibers should be as nearly uniform as possible throughout the web and rim.

A gear constructed as herein described has the advantage of great strength, is light for its size and affords ample clearance, due to the inset ends, for projecting parts on the machine utilizing the gear and adjacent to its supporting shaft. This feature is of great value where the gears are substituted for existing metal gears, as in automobiles, for example. The strength of the gear is due to the compressed textile fibers and the way they are distributed or arranged. By using a few washers between each two disks they are securely anchored or interlocked in place not only to each other but to the disks, and the latter being secured to each other form a web of great relative stiffness for transmitting torque.

I have used the term "disks" to designate all the principal members of the blank which serve to connect the rim with the supporting shaft and which have a small shaft opening. It will be evident however, that if a relatively large central metal support is employed, these members will, more strictly speaking, be rings rather than disks and in using said term in the claims it is my intention to include both such constructions.

The particular method herein referred to of treating woven textile material with a liquid binder and subsequently drying it in a vacuum tank is not claimed herein as it will form the subject matter of a separate application about to be filed.

What I claim as new and desire to secure by Letters Patent of the United States, is:—

1. The method of making blanks of the character described which comprises coating disks and washers made of textile material with a binder, assembling them into a stack having a common axis, said disks and washers being interspersed, and subjecting the same to pressure and heat to compress said material and cause the binder to retain the same in its compressed state.

2. The method of making blanks of the character described which comprises coating disks and washers made of textile material with a binder, pre-forming certain of the disks, assembling the disks and washers into a stack having a common axis with the pre-formed disks at the ends, said washers being interspersed with the disks, and subjecting the material to pressure and heat to compress it and cause the binder to retain the same in its compressed state.

3. The method of making blanks of the character described which comprises assembling disks into a stack with interspersed washers between the disks in the region of their peripheries to form the thickened rim of the blank, said disks and washers being made of textile material which has been previously coated with a binder, and subjecting the material to pressure and heat to compress it and cause the binder to retain the same in its compressed state.

4. The method of making blanks of the character described, which comprises assembling disks into a stack with one set of washers interspersed with the disks in the region of their peripheries to form the thickened rim of the blank and a second set of washers interspersed with the disks near the center thereof to form the thickened hub, said disks and washers being made of textile material which has been previously coated with a binder, and subjecting the material to pressure and heat to compress it and cause the binder to retain the same in its compressed state.

5. The method of making blanks of the character described which comprises assembling pre-formed and flat textile material disks into a stack with the pre-formed disks at the ends, inserting a set of textile material washers between certain of the disks to form the thickened rim, inserting a second set of textile material washers between certain of the disks to form the thickened hub, said disks and washers having been previously coated with a binder, and subjecting the material to pressure and heat to compress it and cause the binder to retain the same in its compressed state.

6. The method of making blanks of the character described, which comprises assembling textile material disks with sets of interspersed washers in the regions of the hub and rim into a stack, said disks and washers having been previously coated with a binder, inserting a metal hub in the center of the stack, placing the stack and metal hub in a fixture, and subjecting the textile material to heat and pressure to compress it and cause the binder to retain the same in compressed state and also bond the material to the metal hub.

7. A blank of the character described comprising a plurality of textile material disks which form the web and also a part of the rim, textile material washers interspersed with the disks to form a part of the rim, said disks serving to transmit torque between the supporting shaft and rim and also to anchor the washers in place, and means for holding the disks and washers in a compressed state.

8. The method of making blanks of the character described which comprises coating woven fabric with a phenolic condensation product, drying the fabric thus coated in a vessel from which air has been evacuated and which is heated to a moderate temperature, cutting the sheets thus formed into disks and washers, stacking the disks with the washers interspersed, and finally subjecting the fabric to pressure and heat to compress it and cause the condensation product to solidify and retain the fabric in a compressed state.

9. The method of making blanks of the character described which comprises stacking in a fixture a plurality of interspersed textile material disks and washers which have been coated with a binder, subjecting both the fixture and its contents to a preliminary heating, subjecting the said material first to a low pressure to permit the air to escape and then to the final pressure and heat to cause the binder to set and hold the fibers under compression.

10. The method of making blanks of the character described which comprises stacking in a fixture a plurality of interspersed textile material disks and washers which have been coated with a binder, subjecting both the fixture and its contents to a preliminary heating, subjecting said material first to low pressure and then to high pressure and heat to cure the binder and cause it to hold the fibers under compression, and finally removing the material from the fixture and further subjecting it to heat.

11. A blank of the character described comprising a plurality of textile material disks which form the web and also a part of the rim, inset disks which form the sides of the blank and also the end faces of the rim, textile material washers interspersed with the disks to form a part of the rim, and means for retaining the disks and washers in a compressed state.

12. A blank of the character described comprising a plurality of textile material disks which form the web and also a part of the rim, inset disks which form the sides of the blank and also the end faces of the rim and hub, sets of large and small textile material washers interspersed with the disks and co-operating with them to form the rim and hub respectively, a metallic hub which is surrounded by the disks and also by the set of smaller washers, and means for retaining the disks and washers in a compressed state.

13. A blank of the character described comprising a plurality of textile material disks which form the web and also a part of the rim, inset disks which form the sides of the blank and also the end faces of the rim, washers of substantially uniform radial depth which are inserted between the disks and which co-operate therewith to form the rim, other washers of greater radial depth which are inserted between the first-named disks and the inset disks, and means for retaining the disks and washers in a compressed state.

14. A blank of the character described comprising a plurality of disks made of woven fabric, a plurality of washers also made of woven fabric and having approximately the same outside diameter as the disks and which are interspersed with them to form the rim, each of said washers having one or more joints therein, and means for holding the disks and washers under substantially uniform compression.

15. A blank of the character described having a thickened rim and a relatively thin web which comprises pieces of textile material which extend inwardly from the rim, and other pieces of textile material which extend outwardly from the center, members made of textile material which are interspersed with the first-named pieces to form the thickened rim, and means for retaining the fibers of said material in a compressed state.

16. A blank of the character described comprising a plurality of textile material washers, pieces of textile material which are interspersed with the washers to form the rim and extend inwardly from the rim, a metallic hub, other pieces of textile material which extend outwardly from the hub and are interlocked with the first-named pieces, and means for holding the fibers of said material under compression.

17. A blank of the character described having a thickened rim and hub and a relatively thin web comprising disks of textile material which form the web and a part of the rim, textile material washers which co-operate with the disks to form the rim, textile material which cooperates with the disks to form the thickened hub, a disk for one side face of the blank which unites the rim, web and hub and has an inset therein between the hub and rim, and a binder which unites the disks, washers and hub material and holds the fibers thereof in compression.

18. A blank of the character described having a thickened rim and hub and a relatively thin web comprising disks of textile material which form the web and a part of the rim, textile material washers which co-operate with the disks to form the rim, textile material which cooperates with the disks to form the thickened hub, a pair of disks which form the side faces of the blanks and which unite the rim, web and hub, each having an inset therein located between the hub and rim, and a binder which unites the disks, washers and hub material and holds the fibers thereof in compression.

19. A blank of the character described comprising a plurality of textile material disks which form the web and also parts of the hub and rim, textile material washers of varying radial depth which cooperate with the disks to form the rim, other textile material which cooperates with the disks to form a thickened hub, a disk which forms one side of the blank and also an end face of the rim, said disk having an inset between the hub and rim, and a binder for retaining the fibers of said materials in a compressed state.

20. A blank of the character described having a thickened rim and a relatively thin web, comprising disks of textile material which form the web and a part of the rim, textile material washers which with the peripheral portion of the disks form the rim, a pair of disks each having an inset and located one on each side of the blank which forms the side faces of the blank and also assist in tying the rim to the web, and a binding material between the adjacent surfaces of the disks and washers which unites them and holds the fibers thereof in compression.

21. A blank of the character described having a thickened rim and hub and a relatively thin web, comprising disks of textile material which form the web and a part of the rim, textile material washers which with the peripheral portion of the disks form the rim, other textile material washers of relatively small diameter which with the central portion of the disks form the hub, a disk which is located on one side of the blank, covers the inner and outer washers and has an inset which forms a part of the web, said disk tying the hub and rim washers to the web, and a binder between the disks and washers which unites said parts and holds the fibers thereof in compression.

22. The method of making blanks of the character described which comprises treating textile material with a binder, cutting the material into disks, hub and rim washers, the former being smaller than the latter, forming insets in a pair of said disks, assembling the disks and washers into a stack having a common axis with an inset disk at the bottom and another at the top to form the side faces of the finished blank, and subjecting the stack thus formed to pressure to compress said material and to heat to cause the binder to harden and retain the material in a compressed state.

In witness whereof, I have hereunto set my hand this 9 day of January, 1923.

EMILE J. GUAY.